United States Patent [19]

Figiel et al.

[11] 3,945,932

[45] Mar. 23, 1976

[54] NOVEL TRICHLOROMONOFLUOROMETHANE-ALCOHOL AZEOTROPES

[75] Inventors: Francis J. Figiel, Boonton; Robert J. Tepper, Parsippany, both of N.J.; Michael L. Dunn, Grand Island, N.Y.

[73] Assignee: Allied Chemical Corporation, New York, N.Y.

[22] Filed: June 19, 1974

[21] Appl. No.: 480,650

[52] U.S. Cl. .......... 252/54; 134/40; 252/DIG. 009; 252/171
[51] Int. Cl.$^2$ .......................................... C10M 3/24
[58] Field of Search .......... 203/63; 252/54, DIG. 9, 252/171; 134/40

[56] References Cited
UNITED STATES PATENTS

| | | | |
|---|---|---|---|
| 3,129,182 | 4/1964 | McLean | 252/54 |
| 3,477,952 | 11/1969 | Bauer et al. | 252/171 |
| 3,664,806 | 5/1972 | Victor | 134/40 X |
| 3,723,332 | 3/1973 | Barton | 252/171 |

OTHER PUBLICATIONS

Mellan—"Industrial solvents", 1950, Reinhold Publ. Co., 2nd Ed.

*Primary Examiner*—Delbert E. Gantz
*Assistant Examiner*—Andrew H. Metz
*Attorney, Agent, or Firm*—Jay P. Friedenson

[57] ABSTRACT

A composition which boils at a substantially constant temperature consisting essentially of trichloromonofluoromethane and an alcohol selected from ethanol, isopropanol or mixtures thereof and the process for using the composition in cleaning and lubricating applications.

6 Claims, No Drawings

NOVEL TRICHLOROMONOFLUOROMETHANE-ALCOHOL AZEOTROPES

BACKGROUND OF THE INVENTION

It is known in the art that fluorocarbon solvents, such as trichloromonofluoromethane, exhibit good stability when compared with chlorinated solvents such as methylchloroform, trichloroethylene, perchloroethylene or methylene chloride. In addition the fluorocarbon solvents are less toxic and are not classified as hazardous materials whereas the chlorinated solvents are considered hazardous, and contain inhibitors which may or may not evaporate faster than the solvent but are required to prevent the formation of toxic decomposition products.

It is known that fluorinated solvents perform well in cleaning and degreasing applications and these applications are even further broadened when the fluorocarbon solvent is mixed with a polar solvent such as an alcohol. Such mixtures exhibit greater solvency power, greater wettability of hydrophilic surfaces, better penetration into hydrophilic substrates and improved heat dissipation due to low surface tension and improved thermal conductivity. Although these advantages can be achieved by mixing fluorocarbon solvents with alcohols in any ratio, it would be preferable to have a mixture of the fluorocarbon solvents and alcohol which boils at a constant temperature in which the amount of alcohol is at a minimum in order to maintain the basic characteristics of the fluorocarbon, eliminate fire hazards due to the presence of the alcohol and to permit purification of the fluorocarbon alcohol mixture by distillation without fractionation. Unfortunately the existence of such constant boiling mixtures cannot be predicted.

Prior art azeotropic mixtures of fluorocarbon solvents with alcohols had an alcohol content, which increased the likelihood of flammability or at least had sufficient alcohol to adversely affect the basic characteristics of the fluorocarbon, e.g., to cause corrosion of a metallic substrate.

An example of such a prior art constant boiling mixture is disclosed in U.S. Pat. No. 3,477,952 which is a composition which boils at a substantially constant temperature consisting of 98 to 96.5 percent by weight trichlorofluoromethane and 2 percent to 3.5 percent by weight methanol. This prior art constant boiling mixture requires too much methanol in that the basic characteristics of the fluorocarbon are affected. For example the use of the trichlorofluoromethane-methanol constant boiling mixture to remove soldering fluxes from circuit boards is not satisfactory in that the high percentage of methanol will attack and dissolve photoresists on the surface of the circuit board. In addition the presence of methanol in a constant boiling mixture or any other mixture creates a toxicity hazard. Furthermore the presence of methanol in conjunction with a fluorinated hydrocarbon such as trichlorofluoromethane results in a composition which will react with certan metallic substrates, e.g. titanium.

A constant boiling composition between a fluorocarbon and alcohol is therefore desirable which contains less than 2 percent alcohol and which contains no methanol.

BRIEF DESCRIPTION OF THE INVENTION

In accordance with this invention a composition is provided which boils at a substantially constant temperature and consists essentially of trichlorofluoromethane and an alcohol selected from ethanol, isopropanol or mixtures thereof. The composition is useful for cleaning or lubricating a substrate by contacting the substrate with the composition.

DETAILED DESCRIPTION OF THE INVENTION

In accordance with this invention a composition which boils at a substantially constant temperature has been unexpectedly discovered which consists essentially or trichloromonofluoromethane and an alcohol selected from ethanol, isopropanol or mixtures thereof. The composition unexpectedly has an alcohol content below two weight percent which decreases the corrosiveness of the composition. When the alcohol is ethanol the composition will have a boiling point at 760 mm. of about 23.5°C. and will contain about 98.9 weight percent of trichloromonofluoromethane and about 1.1 weight percent ethanol. When the alcohol is isopropanol the composition will have a boiling point at 760 mm. of mercury of about 24.8°C. and the composition will comprise about 99.5 weight percent trichloromonofluoromethane and about 0.5 weight percent isopropanol. When mixtures of isopropanol and ethanol are used the composition will have a boiling point at 760 mm. of mercury of about 24.5°C. and will contain about 98.6 weight percent trifluoromonofluoromethane, about 0.7 weight percent ethanol and about 0.7 weight percent isopropanol.

"Substantially constant temperature" as used herein means that over the entire boiling range of the composition the temperature will not vary more than 5°C.

The above compositions have numerous utilities. For example the electronic industry uses predominantly organic resin fluxes for soldering purposes. Excesses of these organic compounds must be removed from electrical substrates after the soldering process. This is accomplished with organic solvents which are compatible with the substrates; that is, the solvent must not react chemically and will evaporate without leaving a residue. The resin fluxes are mixtures of both polar and non-polar compounds thus fluorinated hydrocarbons alone which are non-polar are not effective in removing the polar components of the resins. The compound of the invention containing a small percentage of alcohol can, however, remove both polar and non-polar components and is therefore an effective resin flux removal agent.

Another area where the compound of the invention has particular utility is in the removal of water from solid surfaces. The small percentage of alcohol in the trichloromonofluoromethane acts as a surfactant. The composition having the incorporated alcohol replaces the water with a solvent film that evaporates without leaving a residue on the substrate.

The novel trichloromonofluoromethane-alcohol constant boiling mixtures of this invention are also desirable systems for coolants and lubricants since the compositions have a low surface tension of about 20 dynes per cm., a low viscosity of about 0.44 centipoise at 21°C., and a high density of about 1.4 grams per cc at 21°C. The foregoing physical characteristics are those which are desirable in lubrication applications. For example the compositions in accordance with the invention are desirable when the mixture is used as a lubricant in metal machining such as drilling, routing, tapping, threading, turning or the like, where a residue-free surface is required.

The low surface tension of the composition of the invention makes the composition particularly suitable in cleaning capillary systems. It is known in the art that drainage of such systems, while using common cleaning agents, such as water-detergent cleaning agents, is a major problem, due to the high surface tension, i.e. about 80 dynes per cm. and the relatively high viscosity of the water-detergent system. The high wettability and density of mixtures of trichloromonofluoromethane with isopropanol, ethanol or mixtures thereof make these compositions superior cleaning agents for capillary systems.

The compositions of the invention also find utility in dry cleaning cycles since the compositions in accordance with the invention exhibit polar characteristics in addition to their predominant non-polar characteristics and therefore have a wider range of solvency power than either the fluorocarbon or alcohol alone.

Table I shows the Kauri-butanol value of trichloromonofluoromethane alone and in conjunction with ethanol, isopropanol or both ethanol and isopropanol according to ASTM test D 1133-61. The higher Kauri-butanol value indicates greater solvency.

TABLE I

| COMPONENT TESTED | KAURI-BUTANOL VALUE |
|---|---|
| Trichloromonofluoromethane | 57 |

TABLE I-continued

| COMPONENT TESTED | KAURI-BUTANOL VALUE |
|---|---|
| ($CCl_3F$) 100% | |
| $CCl_3F$ 98.9% | |
| ethanol 1.1% | 70 |
| $CCl_3F$ 99.5% | |
| isopropanol 0.5% | 68 |
| $CCl_3F$ 98.6% | 67 |
| isopropanol 0.7% | |
| ethanol 0.7% | |

We claim:

1. A composition consisting essentially of about 98.9 weight percent trichloromonofluoromethane and about 1.1 weight percent ethanol which has a boiling point at 760 mm of mercury of about 23.5°C.

2. A composition consisting essentially of 99.5 weight percent trichloromonofluoromethane and about 0.5 weight percent isopropanol which has a boiling point at 760 mm of mercury of about 24.8°C.

3. A composition consisting essentially of about 98.6 weight percent trichloromonofluoromethane, about 0.7 weight percent ethanol and about 0.7 weight percent isopropanol which has a boiling point at 760 mm of mercury of about 24.5°C.

4. A method for cleaning or lubricating a substrate by contacting the substrate with the composition of claim 1.

5. A method for cleaning or lubricating a substrate by contacting the substrate with the composition of claim 2.

6. A method for cleaning or lubricating a substrate by contacting the substrate with the composition of claim 3.

* * * * *